(12) United States Patent
Sowinski

(10) Patent No.: US 6,918,205 B1
(45) Date of Patent: Jul. 19, 2005

(54) GRAFTING TOOL

(76) Inventor: Thomas Sowinski, 2822 LaPorte, Highland, IN (US) 46322

(*) Notice: Subject to any disclaimer, the term of this patent is extended or adjusted under 35 U.S.C. 154(b) by 92 days.

(21) Appl. No.: 10/839,940

(22) Filed: May 6, 2004

(51) Int. Cl.$^7$ .............................................. A01G 1/00
(52) U.S. Cl. .................. 47/6; 30/278; 30/286; 30/289; 30/124; 269/287; 269/288; 269/87.1; 47/8
(58) Field of Search .................. 47/6–8, 40.5; 30/278, 30/286, 289, 124; 269/287, 288, 87.1, 47, 269/53, 52, 100, 244

(56) References Cited

U.S. PATENT DOCUMENTS

| | | | |
|---|---|---|---|
| 21,700 A | 10/1858 | Rockwell | |
| 340,699 A | 4/1886 | Congar | |
| 622,898 A * | 4/1899 | Lehy | 30/124 |
| 796,160 A | 8/1905 | Speer | |
| 2,368,420 A | 1/1945 | Masunaga | |
| 2,806,325 A * | 9/1957 | Fox | 47/1.01 R |
| 3,680,255 A | 8/1972 | Grigorov | 47/6 |
| 3,911,577 A * | 10/1975 | Nickel | 30/241 |
| 4,014,132 A | 3/1977 | Cook | 47/6 |
| 4,098,020 A | 7/1978 | Cook | 47/6 |
| 4,348,832 A * | 9/1982 | Hauser | 47/58.1 R |
| 4,731,928 A * | 3/1988 | Jackson | 30/90.2 |
| 4,928,424 A * | 5/1990 | Campanelli et al. | 47/58.1 R |
| 5,020,408 A | 6/1991 | Idema | 83/446 |
| 5,038,479 A * | 8/1991 | Davis | 30/298 |
| 5,261,163 A * | 11/1993 | Shearhart | 30/242 |
| 5,444,938 A | 8/1995 | Pissenberger | 47/6 |
| 5,465,529 A * | 11/1995 | Park | 47/40.5 |
| 5,499,578 A * | 3/1996 | Payne | 99/537 |
| 5,725,193 A * | 3/1998 | Adams | 248/523 |
| 2004/0078983 A1 * | 4/2004 | Birebent | 30/233 |

FOREIGN PATENT DOCUMENTS

| | | | | |
|---|---|---|---|---|
| DE | 4113562 A1 | * | 10/1992 | A01J 27/04 |
| EP | 0384466 | * | 2/1990 | B26B 29/06 |
| EP | 0587267 A1 | * | 5/1993 | B26B 29/06 |
| FR | 2778863 A | * | 5/1998 | B26B 29/06 |

* cited by examiner

Primary Examiner—Peter M. Poon
Assistant Examiner—Andrea M. Valenti
(74) Attorney, Agent, or Firm—O'Keefe Egan & Peterman, LLP

(57) ABSTRACT

A method of cutting a stem to be whip grafted, comprising: securing the stem in a bore of a hand-held grafting tool that includes an angled end, with a portion of the stem extending out from the angled end; drawing a knife across a face of the angled end to thereby cut the stem; and removing the cut stem from the grafting tool. In one respect the hand-held grafting tool comprises a housing having a bore and at least one angled end, a holding member, and moveable connectors attached to the holding member, wherein the moveable connectors protrude through and bisect the housing.

9 Claims, 4 Drawing Sheets

GRAFTING TOOL

BACKGROUND OF INVENTION

This invention pertains to a device useful for whip grafting in the field of horticulture.

A whip-graft is one of the most commonly used of the grafting methods. The whip-graft is used in the propagation of both fruit and ornamental trees. When making the cut on the scion and understock, it is of primary importance to use a scion and understock of the same diameter. Frequently, the length of the scion which had been cut from a shoot from, for example, the preceding year is most workable when cut to a four to six inch length and one-fourth inch in diameter. In the past it has been difficult to mate the two because of uneven cuts owing to too severe of an angle or not enough of an angle.

The present inventor has determined that a need exists for a tool that ensures that the cambium layers are properly mated at the correct angle. In either of these circumstances, poor contact between the two cambium layers of the stock to be mated results in poor results. The present invention has also determined that a need exists for a tool for cleft grafts in that the angle of the cut on the scion remains constant. Furthermore, this invention provides the benefit of minimizing the possibility of injury to the user that are otherwise not uncommon using the hand and knife cutting method. Moreover, by using the grafting tool of this invention, the hands do not come into contact with the cambium layer which would destroy the layer when grafted due to the oils on the hands of the user. In short, this grafting tool is advantageously hand held, provides repeatedly precise angled cuts to stems to be cut. If one end is plugged, the tool also provides the ability to repeatedly and easily make cut stems of a given length.

SUMMARY OF INVENTION

This invention provides a solution to one or more of the problems, needs, and/or disadvantages described above.

In one broad respect, this invention is a method of cutting a stem to be whip grafted, comprising: securing the stem in a bore of a hand-held grafting tool that includes an angled end, with a portion of the stem extending out from the angled end; drawing a knife across a face of the angled end to thereby cut the stem; and removing the cut stem from the grafting tool. In this method, the angled end has an angle of from 5 to 25 degrees based on the angle of the bore to the angled end, or the angled end has an angle of from about 10 to about 15 degrees based on the angle of the bore to the angled end, or the housing is cylindrical, or the stem has a diameter of less than one-half inch, or the grafting tool includes a holding member that engages the stem, or two moveable connectors are connected to the holding member and wherein the moveable connectors extend through and bisect the housing, or the two moveable connectors are screws, or the bore is defined by a housing that is made of a metal, an alloy, or a polymer, or any combination thereof.

In another broad respect, this invention is a hand-held grafting tool, comprising: a housing having a bore and at least one angled end, a holding member, and moveable connectors attached to the holding member, wherein the moveable connectors protrude through and bisect the housing. In the hand-held grafting tool, the housing is cylindrical, or the angled end has an angle of from 5 to 25 degrees based on the angle of the bore to the angled end, or the angled end has an angle of from about 10 to about 15 degrees based on the angle of the bore to the angled end, or rafting tool of claim 1, wherein the housing is triangular or rectangular, or the grafting tool is adapted to secure and cut a stem having a diameter of less than one-half inch, or the grafting tool includes a holding member that engages the stem, or two moveable connectors are connected to the holding member and wherein the moveable connectors extend through and bisect the housing, or the two moveable connectors are screws, or the bore is defined by a housing that is made of a metal, an alloy, or a polymer, or the grafting tool has a length of less than 1 foot and wherein the bore has a diameter of less than about 1.5 inches, or any combination thereof.

In another broad respect, this invention is a process for the manufacture of a grafting tool, comprising: providing a housing having an angled end; attaching a holding member to the grafting tool so that the holding member resides in a bore defined by the housing.

This invention, advantageously, provides a handheld tool and method which enables the user to make precise cuts that ensure that diagonal cuts on two different stems will mate correctly. This invention, likewise, enables cleft grafts in that the angle of the cut on the scion remains constant. For example, this grafting tool ensures an exact cut that exposes an inch to an inch and one-half (1" to 1.5") of a diagonal cut on each piece to be mated.

DETAILED DESCRIPTION OF THE INVENTION

Figure 1A:
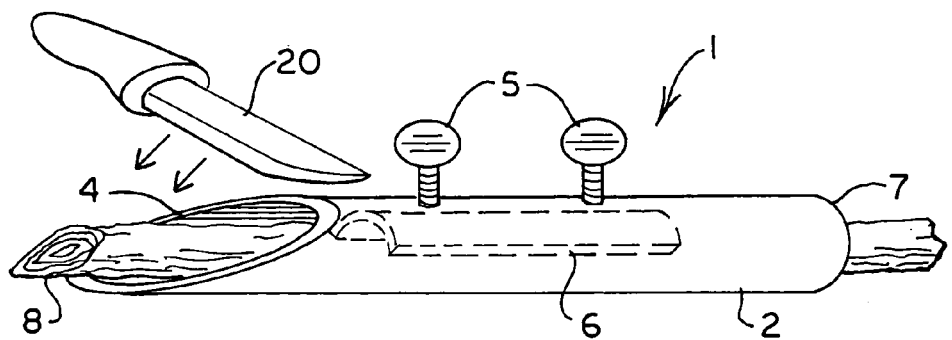
FIG. 1A illustrates a representative hand-held grafting tool of this invention, wherein a stem is engaged in the tool and a knife is depicted which can be used to cut the stem.
Figure 1B:
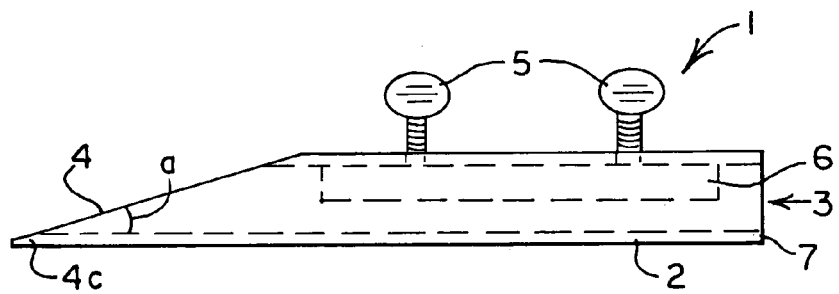
FIG. 1B illustrates a side view of the grafting tool of FIG. 1A.
Figure 1C:
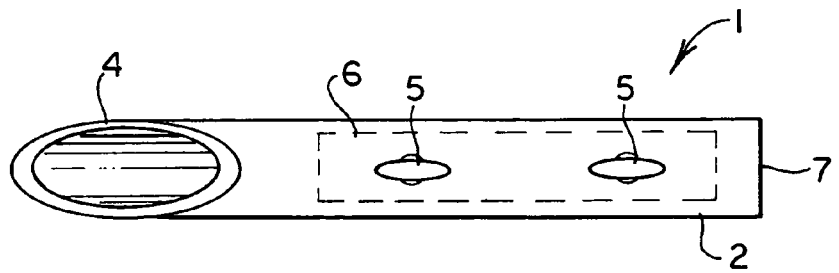
FIG. 1C illustrates a top view of the grafting tool of FIG. 1A.
Figure 1D:
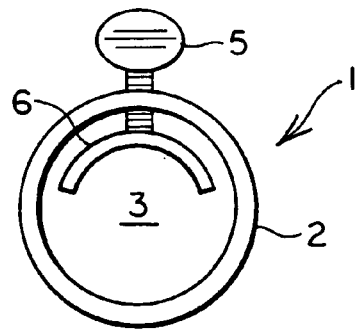
FIG. 1D illustrates a front view of the grafting tool of FIG. 1A.
Figure 1E:
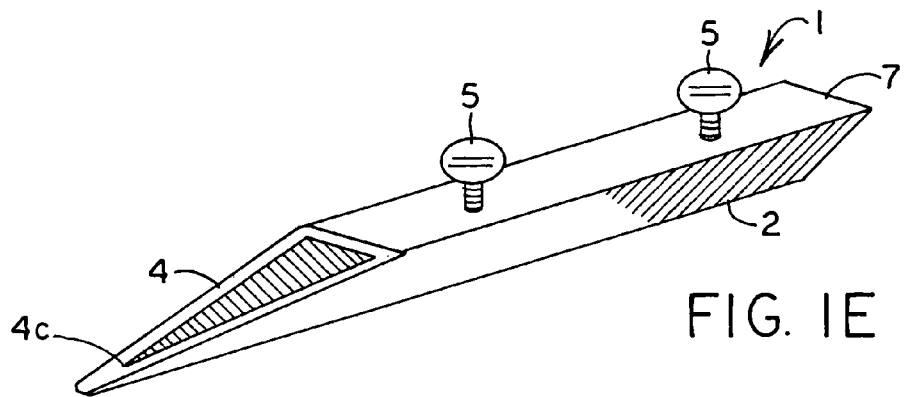
FIGS. 1E and 1F illustrate additional representative grafting tools of this invention.
Figure 1F:
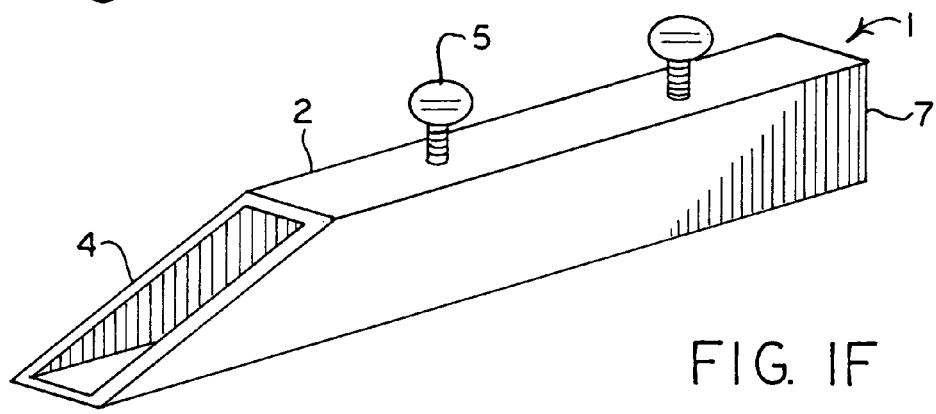
Figure 2:
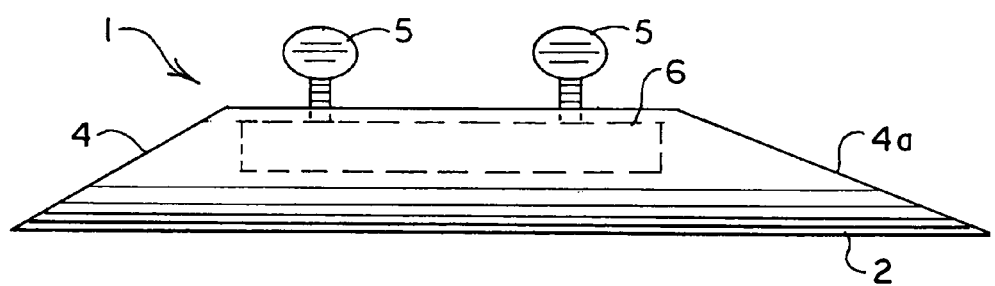
FIG. 2 illustrates a representative grafting tool of this invention which has two ends that may be used to cut the stem.

For the embodiment of this invention shown in FIGS. 1A–1D, the grafting tool 1 comprises a hollow housing (or "chamber") 2 that has a bore 3 there through. The grafting tool 1 has been constructed such that from a side perspective there is an angled end 4. The angled end has an angle so that when a stem is placed in the housing such that it extends beyond the end, a knife can be used to cut the stem by sliding the knife down the face of the end to thereby make a cut at the same angle as that of the end of the tool. In general, the angle of the end is such that a stem having a diameter of approximately one-quarter inch will be cut to expose an inch to an inch and one-half (or even up to two inches) of the a diagonal cut on the stem. The angle "a" in FIG. 1B is measured based on the angle formed at the intersection of the bore to the face of the end at the point 4c of the grafting tool 1. The angle of the end can thus vary, with "a" typically being in the range from about 5 to about 25 degrees, more typically from about 10 to about 15 degrees. It should be appreciated that the angle may vary depending on the size and type of the stem to be cut. In one alternative embodiment such as depicted in FIG. 2, the grafting tool has a first end 4 and a second end 4a configured such that the ends of the tool have different angles so that the person using the tool can select a desired angle to make the cut on the stem. In the embodiment depicted in FIG. 1A, the housing 2 has a tubular shape; however, this shape can vary such as shown in FIGS. 1E and 1F where the bore has triangular shape and rectangular (or square) shape, respectively. The housing 2 includes a second end 7 that can be open or closed (capped).

The housing 2 can be made of a wide variety of materials, such as iron metal (or any other metal such as aluminum, or an alloy), ceramic, or a durable plastic material such as PVC pipe, the latter having the advantage of being light weight, the former having the advantage of being very durable after repeated use. The housing can be made to have a round bore or can be of other configuration such as shown in FIG. 1E where the angled end has the appearance of a triangle when observed from the end. In the configuration in FIG. 1E, the housing is made of three flat sides, with the angled end being cut before or after fabrication of the housing. In the configuration shown in FIG. 1F, the housing is made of four flat sides, with the angled end being cut before or after fabrication of the housing.

The housing is selected with a bore suitable for use with the typical size of stems to be whip grafted. For instance, it is common to use stems that have a diameter of less than two inches, typically less than one inch, more typically less than one-half inch, and in one embodiment about one-quarter inch. Thus, the bore of the housing is typically no more than about two inches in diameter and more typically no more than about one and one-half inch in diameter, more typically no more than an inch in diameter. Similarly, the length of the housing can vary widely, but since the stems to be cut are usually four to six inches long, the housing need not be more than six inches long to accommodate the stems. The housing should be at least about three inches long so that the operator can firmly hold the grafting tool during use.

Figure 3:
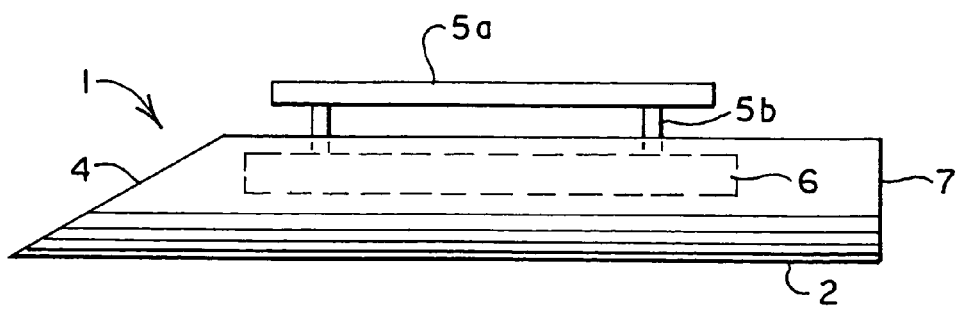
FIG. 3 illustrates a representative grafting tool of this invention that employs a depressible handle to engage the stem.

Referring again to FIGS. 1A–1D, the grafting tool 1 includes a holding member 6 (alternatively, multiple holding members can be used) which is at least partially within the bore 3 of the housing 2. The holding member may be held in place by one or two or more moveable connector(s) 5. In one embodiment, not shown in FIGS. 1A–1D, the moveable connector(s) serve the dual function of being used as the holding member. In FIGS. 1A–1D, two moveable connectors are depicted. The moveable connectors serve to engage a stem 8 with the holding member 6 within the housing so that the stem to be cut does not move while the cut is made with a knife (the knife not being an embodiment of this invention). In this regard the stem is immobilized or secured within the grafting tool. The moveable connectors can be, for example, screws that force the holding member against the stem thereby holding the stem in place. Conversely, moveable connectors can be spring loaded, with pressure being applied by the user's hand while the cut is made or alternatively spring shut after the stem has been placed in the grafting tool 1. Similarly, as depicted in FIG. 3, the holding member 6 can be attached to simple metal rods 5b (alternatively spring loaded) or the like that slideably extend out of the housing and attach to a grip 5a that can be squeezed manually by the operator when a cut is to be made, with the position of the holding member being manually changed by the operator between cuts to remove or place a stem in the housing. It should be appreciated that depending on the embodiment, one, two, three, or more moveable connectors may be used in the grafting tool 1.

Figure 4:
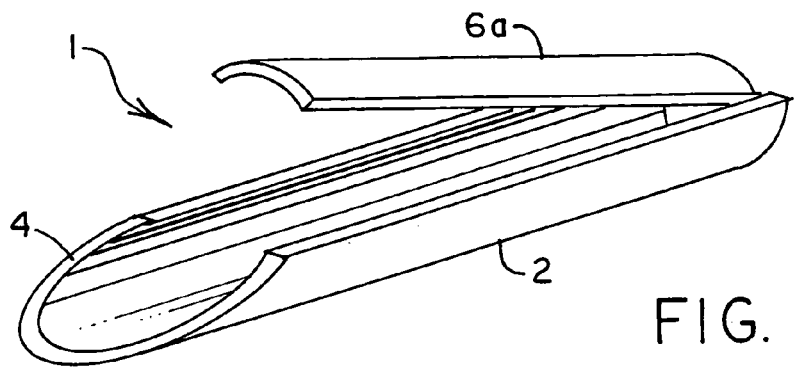
FIG. 4 illustrates a representative grafting tool of this invention that employs a pivotably attached holding member.

FIG. 4 illustrates an alternative embodiment of the invention. In this configuration, the configurations of holding member 6a is pivotably attached (hinged) to the housing 2 so that the operator can apply pressure directly to the holding member 6a so as to hold the stem in place during a cut.

Figure 5:
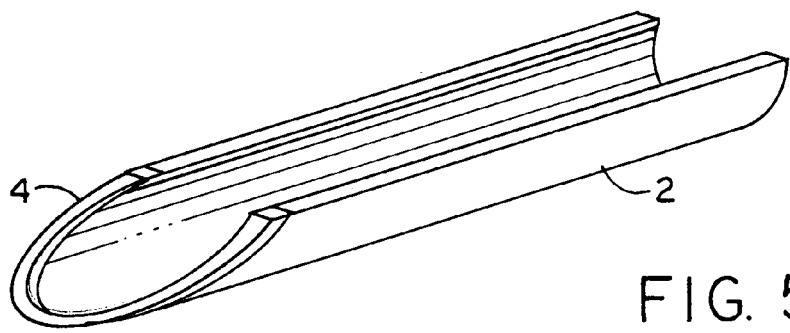
FIG. 5 illustrates a representative grafting tool of this invention that employs an elastic body which can be used to hold the stem in place during a cut.

FIG. 5 depicts another embodiment of the invention is that can be used in the practice of this invention wherein the housing 2 is made of an elastic or otherwise pliable material which is attached to the angled end 4. In this embodiment, the stem is held in place by direct application of pressure by the operator to immobilize the stem while it is being cut. Conversely, the housing in FIG. 5 can be rigid, with the operator holding the stem in place by applying pressure directly to the stem while cutting. This latter embodiment is not as desirable due to the risk of injury to the operator as well as the risk that the stem could become loose during the cut. In this configuration, additional care should be exercised by the user to avoid a cutting accident.

Figure 6A:
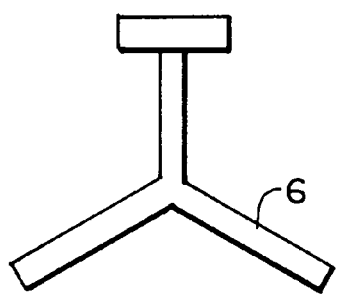
FIGS. 6A, 6B, 6C, and 6D illustrate front views of representative designs that can be employed for the structure of the holding member.
Figure 6B:
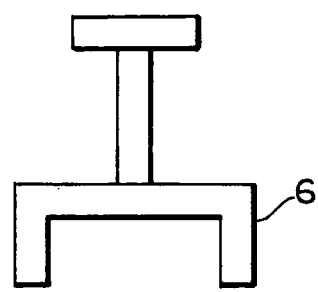
Figure 6C:
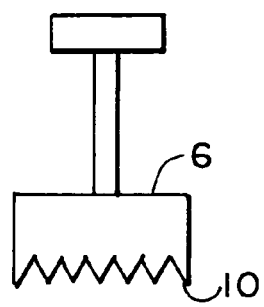
Figure 6D:
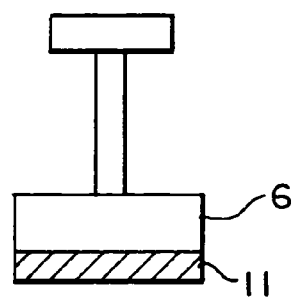

FIGS. 6A–6D illustrate a variety of shapes from an end perspective of holding members. In FIG. 6A, the holding member 6 has a Y-shape. In FIG. 6B, the holding member 6 has a U-shape. In FIG. 6C, the hold member 6 is a flat plate with serrations or grooves 10 which assist in immobilizing the stem. In FIG. 6D, the holding member 6 is attached to an elastic pad or foam pad 11 that serves to contact and grip the stem with reduced risk of damaging the stem.

Figure 7:
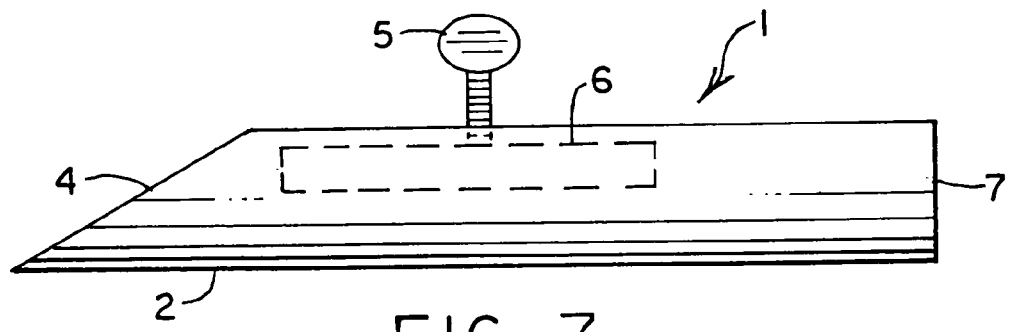
FIG. 7 illustrates a representative grafting tool of this invention that employs a single moveable connector.

FIG. 7 shows an embodiment of the invention wherein the grafting tool 1 employs a single moveable connector 5 that connects to the holding member 6.

Figure 8:
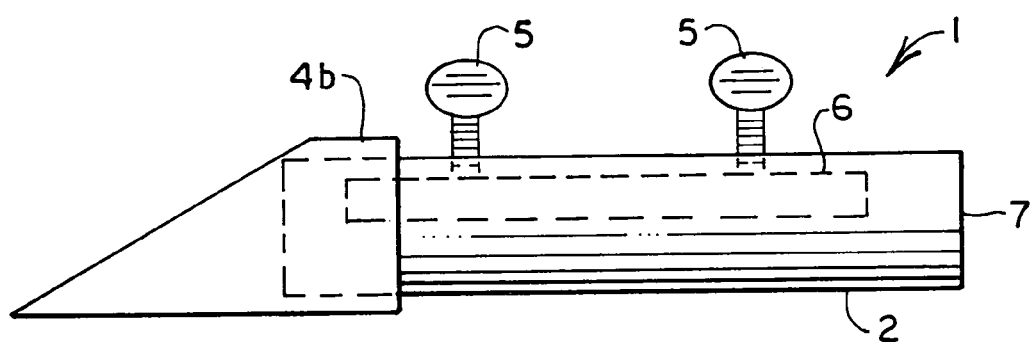
FIG. 8 illustrates a representative grafting tool of this invention that employs a removable angled end for cutting the stems.

FIG. 8 illustrates another embodiment of the invention wherein the grafting tool 1 includes a detachable end 4b that connects to the housing. In this way, the end can be changed out due to use, or to use an end with a different angle, as desired by the operator.

Figure 9:
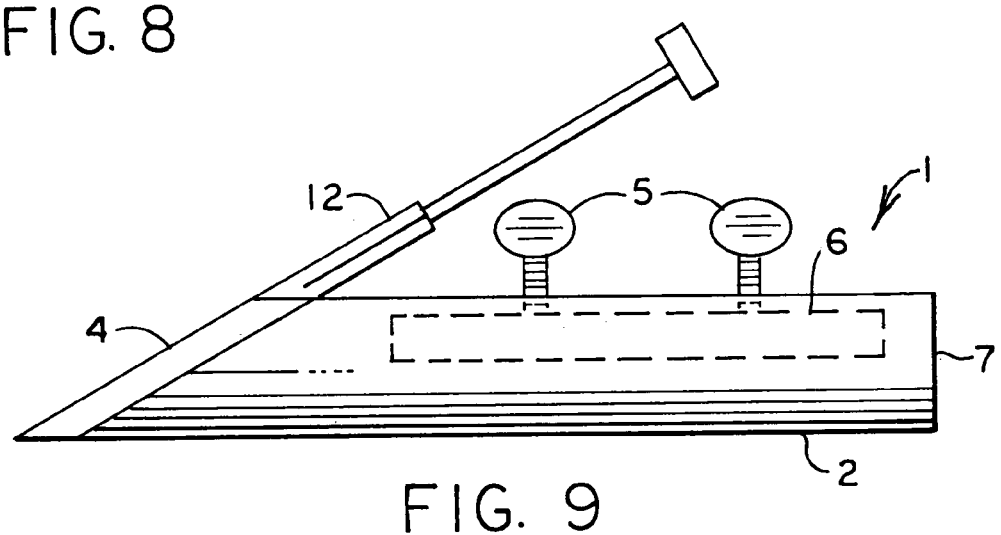
FIG. 9 illustrates a representative grafting tool of this invention that includes a built-in cutter.

FIG. 9 depicts another embodiment of the grafting tool 1 wherein a cutting tool 12 is built into the grafting tool 1 for convenience of use by the operator.

The method by which the grafting tool of this invention is used may be illustrated by reference again to FIG. 1A. A stem 8, which can be of any diameter suitable for cutting by hand using a knife, is inserted into the bore 3 of the housing 2 so that one end of the stem 8 protrudes out the angled end 4. Next, the moveable connectors are actuated to engage the holding member 6 against the stem. By applying a suitable amount of pressure in this manner, the stem 8 becomes firmly held in place in the bore 3 of the housing. After the stem 8 has thus been immobilized in the grafting tool, the operator, while holding the grafting tool 1, uses a suitable knife 20 to cut the stem 8 along the face of the angled end 4. It should be appreciated that the operator may be holding the knife or may alternatively use a secured knife and draw the end across the knife. In this way a reproducible angled cut is made in the stem 8. Since the cuts are always made to precisely the same angle by use of the grafting tool 1, two cut stems of similar diameter can be readily whip grafted together. Thus, the tool and method of this invention ensure that the cambium layers are properly mated at the correct angle.

What is claimed is:

1. A method of cutting a stem to be whip grafted, comprising: securing the stem in a bore of a hand-held grafting tool that includes an angled end, with a portion of the stem extending out from the angled end; drawing a knife across a face of the angled end to thereby cut the stem; and removing the cut stem from the grafting tool, wherein the grafting tool comprises a housing having the bore and the angled end, an elongated holding member located within the bore, and moveable connectors that are perpendicularly connected to the holding member, wherein the moveable connectors protrude through and bisect the housing through separate apertures in the housing.

2. The method of claim 1, wherein the angled end has an angle of from 5 to 25 degrees based on the angle of the bore to the angled end.

3. The method of claim 1, wherein the angled end has an angle of from about 10 to about 15 degrees based on the angle of the bore to the angled end.

4. The method of claim 1, wherein the housing is cylindrical.

5. The method of claim 1, wherein the stem has a diameter of less than one-half inch.

6. The method of claim 1, wherein the grafting tool includes a holding member that engages the stem.

7. The method of claim 6, wherein two moveable connectors are connected to the holding member and wherein the moveable connectors extend through and bisect the housing.

8. The method of claim 7, wherein the two moveable connectors are screws.

9. The method of claim 1, wherein the bore is defined by a housing that is made of a metal, an alloy, or a polymer.

* * * * *